US009354318B1

(12) United States Patent
Beard et al.

(10) Patent No.: US 9,354,318 B1
(45) Date of Patent: May 31, 2016

(54) OPTICAL SPREAD SPECTRUM DETECTION AND RANGING

(71) Applicant: Horizon Hobby, LLC, Champaign, IL (US)

(72) Inventors: Paul Beard, Big Fork, MT (US); Jeff Walker, Champaign, IL (US)

(73) Assignee: Horizon Hobby, LLC, Champaign, IL (US)

( * ) Notice: Subject to any disclaimer, the term of this patent is extended or adjusted under 35 U.S.C. 154(b) by 0 days.

(21) Appl. No.: 14/639,791

(22) Filed: Mar. 5, 2015

(51) Int. Cl.
G06F 17/00 (2006.01)
G01S 17/93 (2006.01)
G01S 17/08 (2006.01)
B60W 30/09 (2012.01)

(52) U.S. Cl.
CPC ............... *G01S 17/93* (2013.01); *B60W 30/09* (2013.01); *G01S 17/08* (2013.01)

(58) Field of Classification Search
None
See application file for complete search history.

(56) References Cited

U.S. PATENT DOCUMENTS 7,164,117 B2 * 1/2007 Breed ............... B60R 21/01516
250/208.1
7,405,812 B1 * 7/2008 Bamji .................. G01S 13/325
356/5.1
2012/0307230 A1 12/2012 Dorrington et al.
2014/0186050 A1 * 7/2014 Oshima .............. H04B 10/1143
398/118
2014/0286644 A1 * 9/2014 Oshima .................. H04B 10/11
398/118

FOREIGN PATENT DOCUMENTS

EP 2626722 8/2013
WO 2014149705 9/2014

OTHER PUBLICATIONS

Achuta Kadambi, et al.; Coded Time of Flight Cameras: Sparse Deconvolution to Address Multipath Interferance and Recover Time Profiles; Massachusetts Institute of Technology, Boston USA, University of Waikato, Waikato, NZ; pp. 1-10.
Hoe-Ming Wong; Registration of range images using geometric features; Master's Thesis in Geometrics; Optical & Laser remote sensing Section Faculty of Civel Engineering, Delft University of Technology, Mekelweg 4, 2628 CD Delft, The Netherlands; Jun. 1, 2012; pp. 1-96.

* cited by examiner

Primary Examiner — Adam Alharbi
(74) Attorney, Agent, or Firm — Barnes & Thornburg LLP

(57) ABSTRACT

Example implementations may relate to an obstacle detection system. In particular, an example device may include a light emitter, a line-image sensor, and a controller that are mounted on a rotatable component. In an example embodiment, the line-image sensor may receive light signals emitted from the light emitter. The controller may be communicatively coupled to the light emitter and line-image sensor and configured to determine a multipath signal based on the time of flight of the light signal and the position along the line-image sensor at which the line-image sensor received the given reflected light signal.

10 Claims, 7 Drawing Sheets

800

```
┌─────────────────────┐
│   EMITTING A LIGHT  │──801
│       SIGNAL        │
└──────────┬──────────┘
           │
           ▼
┌─────────────────────────────────┐
│ RECEIVING A REFLECTION OF THE   │
│ EMITTED SIGNAL AT A POSITION    │──802
│ ALONG A LINE-IMAGE SENSOR       │
└──────────┬──────────────────────┘
           │
           ▼
┌─────────────────────────────────────┐
│ DETERMINING WHETHER THE REFLECTION IS│
│ A MULTI-PATH SIGNAL BASED ON (I) AN │
│ AMOUNT OF TIME BETWEEN EMISSION OF  │──803
│ THE LIGHT SIGNAL AND RECEPTION OF THE│
│ REFLECTION , AND (II) THE POSITION AT│
│ WHICH THE LINE-IMAGE SENSOR RECEIVED │
│ THE REFLECTION                       │
└─────────────────────────────────────┘
```

FIG. 8

OPTICAL SPREAD SPECTRUM DETECTION AND RANGING

BACKGROUND

Unmanned vehicular systems may be used for applications involving transportation, imaging, agriculture, industrial inspection, hobby, and emergency aid, among others. As unmanned systems become increasingly prevalent, the need for systems capable of safe operation becomes apparent. Therefore, a demand for vehicular systems has helped open up a field of innovation in unmanned vehicle control and sensing techniques, as well as component design and assembly.

SUMMARY

Example implementations may relate to a sensing system (e.g., a sensing system for a collision avoidance system) including a light emitter, a line-image sensor, and a controller. Some optical obstacle detection systems rely on a time of flight measurement for emitted light. One drawback of such systems is that false positives may occur. For example, false positives may occur due to ambient noise, multipath propagation, and phase jitter (or phase noise). Another drawback of such systems is that false negatives may occur. For example, false negatives may occur due to sensitivity issues of the light sensor (e.g., swamping, flooding, or blooming issues). In part to overcome these and other drawbacks, embodiments of the disclosed systems and methods include, e.g., emitting patterns of light, combining time of flight and a position along the sensor, and timing a shutter with the expected incoming light signals, among others and as described in more detail herein.

In one aspect, a system is provided. The system includes a light emitter configured to emit a light signal, a line-image sensor configured to receive reflected light signals at a plurality of positions along the line-image sensor, and a controller. The controller is communicatively coupled to the light emitter and the line-image sensor, and is configured to determine whether a given reflected light signal received at the line-image sensor is a multi-path signal based on (i) an amount of time between emission of the light signal from the light emitter and reception at the line-image sensor of the given reflected light signal, and (ii) a position along the line-image sensor at which the line-image sensor received the given reflected light signal.

In one aspect, a collision avoidance system is provided. The collision avoidance system includes an inertial measurement unit configured to measure rotation and acceleration of a vehicle about one or more axes of the vehicle. The collision avoidance system also includes an obstacle detection unit with a light emitter configured to emit a light signal, a line-image sensor configured to receive reflected light signals at a plurality of positions along the line-image sensor, and a controller communicatively coupled to the light emitter and the line-image sensor. The controller is configured to determine whether a given reflected light signal received at the line-image sensor is a multi-path signal based on (i) an amount of time between emission of the light signal from the light emitter and reception at the line-image sensor of the given reflected light signal, and (ii) a position along the line-image sensor at which the line-image sensor received the given reflected light signal. The collision avoidance system also includes a control system, where the control system is communicatively coupled with the inertial measurement unit and the obstacle detection unit, and where the control system is configured to control the vehicle to avoid detected objects by sending control outputs to the vehicle based on information received from the inertial measurement unit and the obstacle detection unit.

In one aspect, a method is provided. The method includes emitting a light signal from a light emitter and receiving a reflection of the emitted light signal. The reflection of the emitted light signal is received at a position along a line-image sensor. The method also includes determining whether the reflection of the emitted light signal received at the line-image sensor is a multi-path signal based on (i) an amount of time between emission of the light signal and reception at the line-image sensor of the reflection of the emitted light signal, and (ii) the position along the line-image sensor at which the line-image sensor received the reflection of the emitted light signal.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 8 is an example flowchart for determining a multipath signal, according to some embodiments.

DETAILED DESCRIPTION

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

According to various implementations, described herein are systems and methods for an obstacle detection system. An example system may include a light emitter and a line-image sensor. The system is configured to sense proximity information and distance of nearby objects. In an example embodiment, the obstacle detection system may also include an inertial measurement unit to measure rotation and acceleration around one or more axes (e.g., rotation around a pitch, roll, or yaw axis of an unmanned aerial vehicle).

II. Illustrative Systems

Figure 1A:
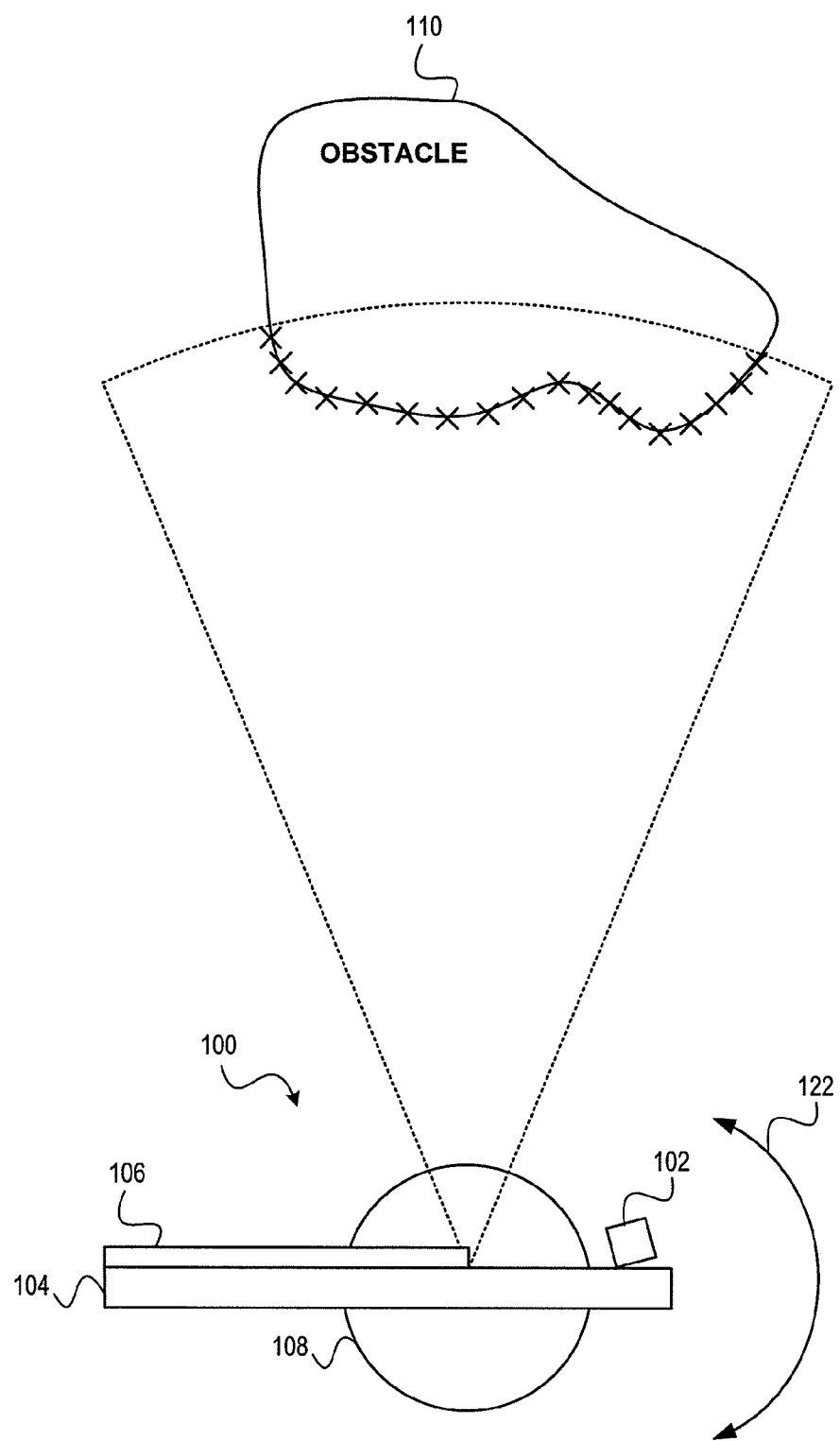
FIGS. 1A and 1B depict an example obstacle detection system 100, according to example embodiments.

FIG. 1A depicts an example obstacle detection system 100 according to some embodiments. System 100 includes a light emitter 102 positioned at one end of a line-image sensor 104. In some embodiments, the line-image sensor is a Charge-Coupled Device (CCD) line-image sensor or a Complementary Metal Oxide Semiconductor (CMOS) line-image sensor, or an array of multiple CCD or CMOS sensors. The line-image sensor 104 may include a filter 106 overlaid atop the line-image sensor. The filter 106 may be an optical filter. In some embodiments, an optical filter may be used to pass desired wavelengths of light and block undesired wavelengths of light to improve the operation of the line-image sensor 104. For example, a line-image sensor with short-wave infra-red may use an optical filter to pass wavelengths of light between 0.9 micrometers to 1.7 micrometers and block wavelengths of light outside of the 0.9-1.7 micrometer range).

In some embodiments, the line-image sensor 104 and the light emitter 102 are mounted on a rotatable component 108 in a sensor-emitter configuration. The rotatable component 108 may be connected to a motor, such as a brushless DC motor, which is operable to turn to the rotatable component 108, thereby allowing the system to rotate and/or point the sensor-emitter configuration in a particular director, in a variety of directions, or in a range of directions. It should be noted that the particular arrangement depicted in FIG. 1 is an example, and in other examples the components may be arranged differently, perhaps with more or fewer components. For example, the line-image sensor 104 has a proximate end and a distal end. In some embodiments, the proximate end may be closer to light emitter 102, but in other embodiments, the distal end may be closer to the light emitter 102.

In practice, system 100 may be positioned on the front of a vehicle, such as an unmanned aerial vehicle, and may be configured to detect the presence of obstacles, such as obstacle 110, in front of the vehicle. In accordance with some embodiments, light emitter 102 emits a light signal in the direction of obstacle 110. The light signal may reflect off of the obstacle and return to system 100 and be detected by the line-image sensor 104. As indicated above, system 100 may be mounted on a rotatable component connected to a motor that is operable to rotate or turn the rotatable component. Thus, the rotatable component may be used to sweep the obstacle detection system 100 back and forth in the direction shown by arrows 122. As such, individual emitted light signals may reflect off of a number of different locations of obstacle 110 (indicated in FIG. 1 with 'X's). In this way, system 100 may roughly determine the shape of an obstacle, perhaps in order to adjust a flight plan so as to avoid the obstacle.

Of course, the rotatable component may be configured to sweep in other directions, or in multiple directions. For example, the rotatable component may be a 3-axis gimbal that has three axes of rotation. Each axis of rotation may be connected to a motor, such as a brushless motor, that is operable to move the 3-axis gimbal and point the sensor-emitter configuration in any of the three axes of rotation of the gimbal.

Figure 1B:
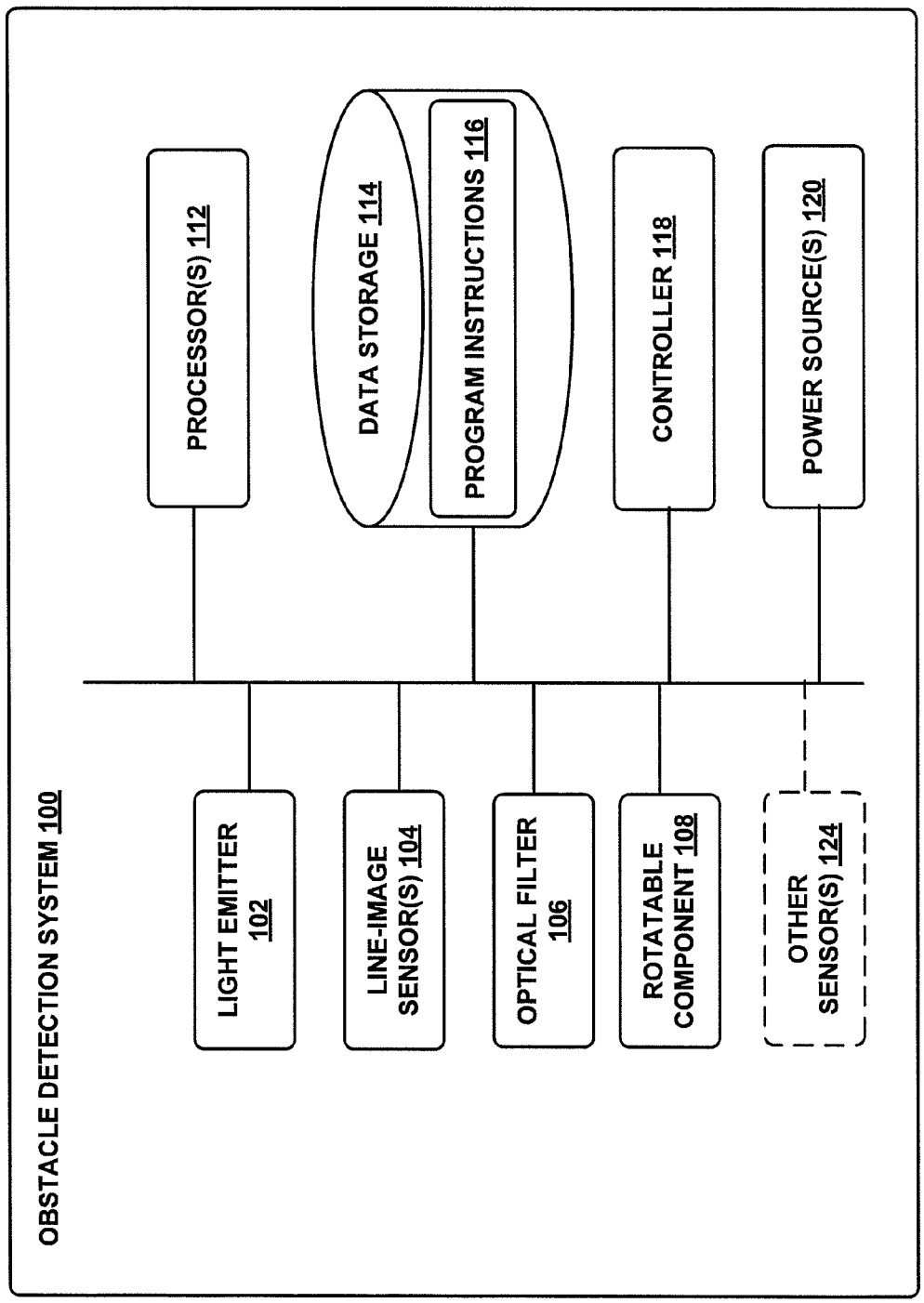

FIG. 1B is a block diagram showing components of an example obstacle detection system 100 according to some embodiments. Obstacle detection system 100 includes one or more processor(s) 112, data storage 114, program instructions 116, controller 118, and power source(s) 120. Note that the obstacle detection system 100 is shown for illustration purposes only and may include additional components and/or have one or more components removed without departing from the scope of the disclosure. Further, note that the various components of obstacle detection system 100 may be communicatively coupled or otherwise in communication with each other in any manner now known or later developed that enables the components to operate as a system to perform the functionality described herein.

Processor(s) 112 may be a general-purpose processor or a special purpose processor (e.g., digital signal processors, application specific integrated circuits, etc.). The processor(s) 112 can be configured to execute computer-readable program instructions 116 that are stored in the data storage 114 and are executable to cause the obstacle detection system 100 to perform the functions and features described herein. For instance, the program instructions 116 may be executable to provide functionality of the controller 118, where the controller 118 may be configured to instruct a motor to cause movement of one or more movable component (e.g., rotatable component 108).

The data storage 114 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 112. In some embodiments, the data storage 114 can be implemented using a single physical device (e.g., one optical, magnetic, organic or other memory or disc storage unit), while in other embodiments, the data storage 114 can be implemented using two or more physical devices. Further, in addition to the computer-readable program instructions 116, the data storage 114 may include additional data such as diagnostic data, among other possibilities.

The obstacle detection system 100 may optionally include one or more additional sensor(s) 124, in addition to line-image sensor 104, such as load sensors, position sensors, touch sensors, ultrasonic range sensors, infrared sensors, Global Positioning System (GPS) receivers, sonar, optical sensors, biosensors, force sensors, proximity sensors, Radio Frequency identification (RFID) sensors, Near Field Communication (NFC) sensors, wireless sensors, compasses, smoke sensors, light sensors, radio sensors, depth sensors (e.g., Red Green Blue plus Depth (RGB-D), lasers, structured-light, and/or a time-of-flight camera), microphones, speakers, radar, cameras (e.g., color cameras, grayscale cameras, and/or infrared cameras), and/or motion sensors (e.g., gyroscopes, accelerometers, inertial measurement units (IMU), and/or foot step or wheel odometry), among others. The additional sensor(s) 124 may provide sensor data to the processor(s) 112 to allow for appropriate interaction of the obstacle detection system 100 with the environment.

Additionally, the obstacle detection system 100 may also include one or more power source(s) 120 configured to supply power to various components of the obstacle detection system 100. Any type of power source may be used such as, for example, a gasoline engine or a battery.

Figure 2:
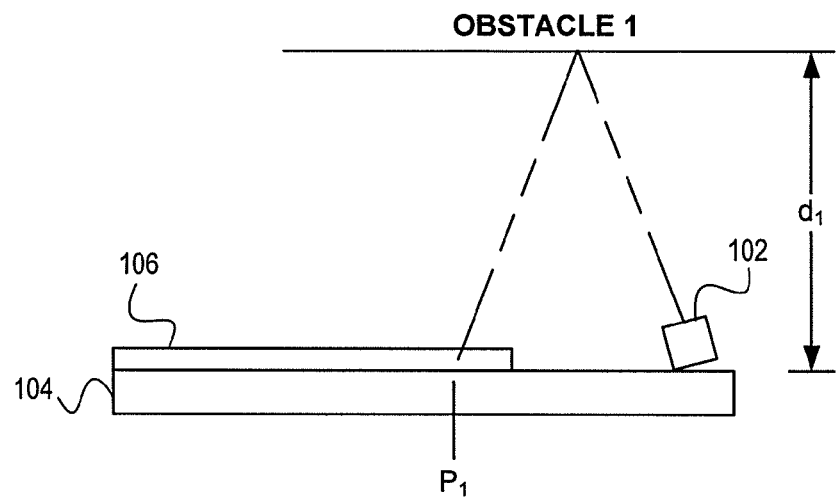
FIGS. 2 and 3 illustrate obstacles at different distances, according to example embodiments.
Figure 3:
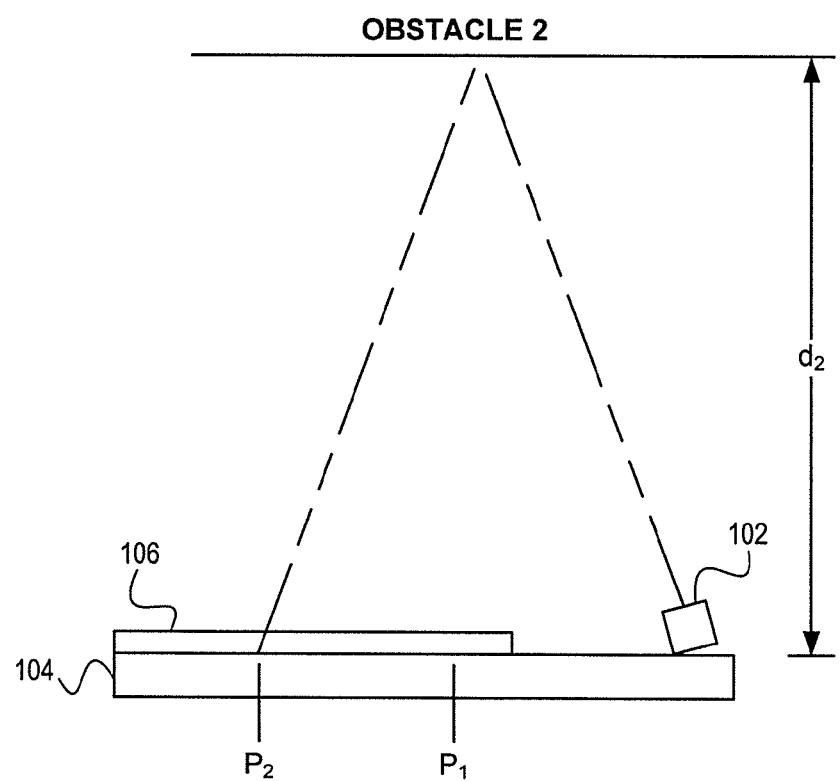

FIGS. 2 and 3 illustrate distance calculations according to time of flight, according to an example implementation of an obstacle detection system, such as obstacle detection system 100 described above in reference to FIGS. 1A and 1B. Time of flight measures the time taken for a light pulse to travel to the target and back. By using the time of flight and the speed of light, the distance can be calculated. For example, as illustrated in FIG. 2, a distance $d_1$ may be calculated by:

$$d_1 = \frac{c * t}{2}$$

where c is the speed of light (~$3*10^8$ meters per second) and t is the time of flight of the light pulse from the light emitter 102 to position $P_1$ on the line-image sensor 104.

Likewise, in reference to FIG. 3, distance $d_2$ may be calculated using the time of flight of the light pulse from light emitter 102 to position $P_2$ on the line-image sensor 104.

In addition to distance based on the time of flight, the system can also estimate distance by the location (or position) on the line-image sensor 104 where the system detects the reflected light pulse. For example, in FIG. 3, position $P_1$ (where the line-image sensor 104 detected the light pulse reflected from Obstacle 1 in FIG. 2) is closer to the light emitter 102 than position $P_2$ (where the line-image sensor 104 detected the light pulse reflected from Obstacle 2 in FIG. 3). Thus, the distance that a light pulse travels from the light emitter 102 to an obstacle and then back to the line-image sensor 104 can be estimated both by (i) the time of flight of the light pulse and (ii) the location on the line-image sensor 104 where the light pulse is detected. However, distance estimates between the system and an obstacle are susceptible to errors due to multipath signals.

Figure 4:
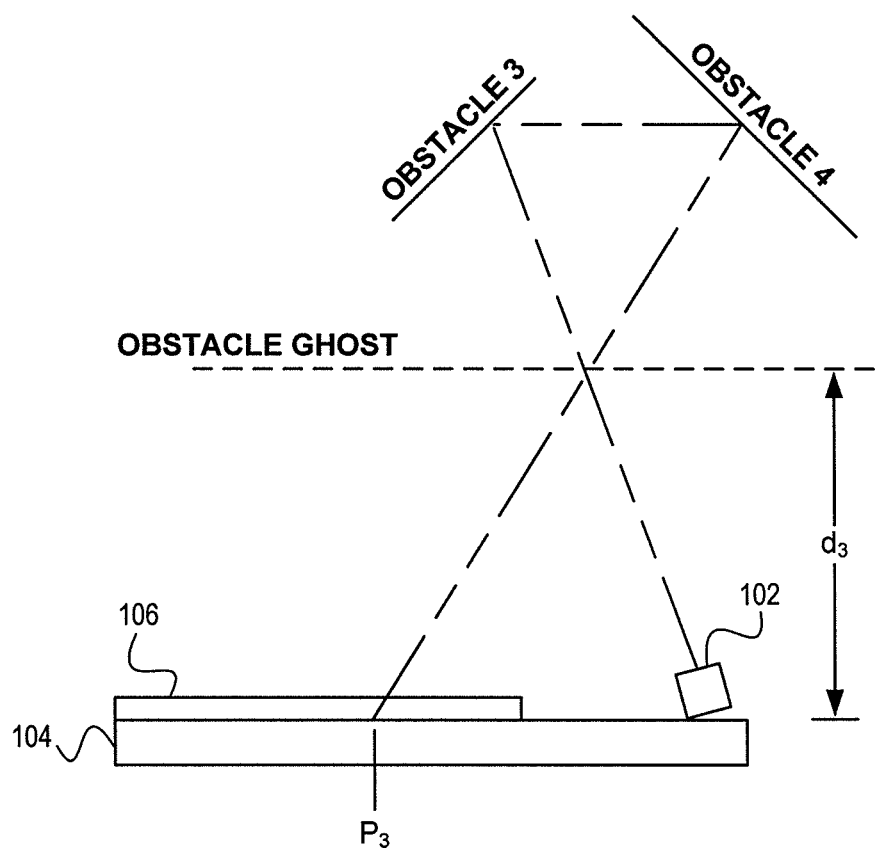
FIG. 4 illustrates the occurrence of a multipath signal in an obstacle detection system according to some embodiments.

FIG. 4 illustrates the occurrence of a multipath signal in an obstacle detection system. As illustrated, the light pulse from light emitter 102 travels a multi-propagation path to obstacle 3, then to obstacle 4, then to position $P_3$ on the line-image sensor 104. Because the control system detects the reflected light pulse at position $P_3$, the control system may interpret an obstacle "ghost" at distance $d_3$, even though no obstacle exists at that distance. However, the distance calculated by the time of flight is not equal to distance $d_3$ due to the multipath signal. Thus, the distance estimate based on the time of flight is different than the distance estimate based on the location along the line-image sensor 104 where the system detected the reflected light pulse, thereby indicating a multipath signal.

Figure 5:
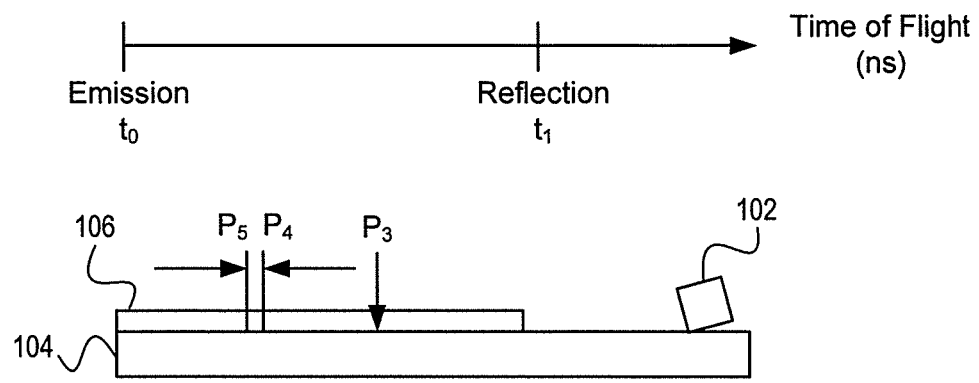
FIGS. 5 and 6 illustrate example windowing techniques, according to some embodiments.
Figure 6:
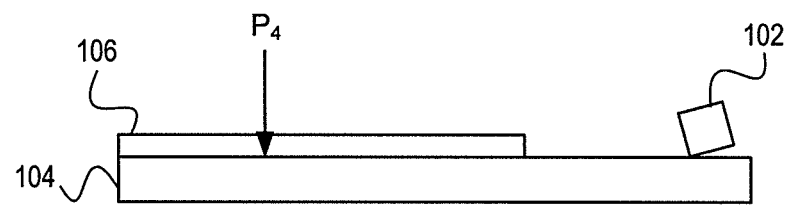
Figure 6:
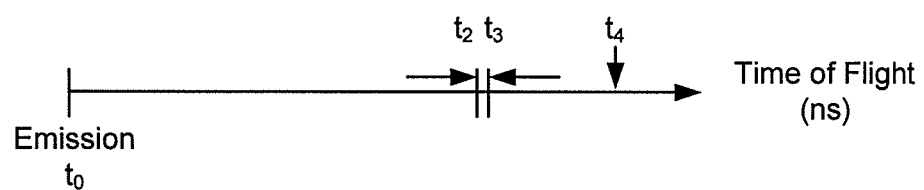

FIGS. 5 and 6 illustrate example windowing techniques to handle multipath signals, according to an example implementation. As illustrated in FIG. 5, a light pulse is emitted at time $t_0$ by light emitter 102. The light pulse is received at time $t_1$ at the line-image sensor 104. Thus, the time of flight (e.g., in nanoseconds) may be calculated by subtracting $t_0$ from $t_1$:

$$t_1 - t_0.$$

For example, a control system (e.g., a control system comprising processor(s) 112 configured to execute computer-readable program instructions 116 that are stored in the data storage 114 and are executable to provide the functionality of the obstacle detection system 100 described herein) may calculate time of flight based on the time of emission from the light emitter 102 and time of reception at the line-image sensor 104.

In reference to FIG. 5, the obstacle detection system may identify and discard multipath signals to avoid an obstacle "ghost" by windowing position on the line-image sensor 104. In some example implementations, the control system may use the time of flight to identify a window of positions along the line-image sensor 104. The window enables the obstacle detection system to distinguish between "valid" signals and multipath signals based in part on the location along the line-image sensor 104 where the signal is received. Signals outside of that window may be identified as multipath signals and discarded. For example, the control system can identify (i) signals that are received between positions $P_4$ and $P_5$ at a specific time t as "valid" signals (not multipath signals) and (ii) signals that are received outside of $P_4$ and $P_5$ at time t as a multipath signals. For example, if the line-image sensor receives an emission at position $P_3$ (i.e., outside of the window between positions $P_4$ and $P_5$) the control system may identify that emission as a multipath signal and discard or exclude that detected emission from any calculation of an estimated distance.

In reference to FIG. 6, the obstacle detection system may additionally or alternatively identify and discard multipath signals to avoid an obstacle "ghost" by windowing a time of flight. In some example implementations, the control system may use position of the received light emission along the line-image sensor 104 to identify a window of times of flight. The window enables the obstacle detection system to distinguish between "valid" signals and multipath signals based at least in part on the timeframe during which the line-image sensor 104 receives the signal. Signals outside the window of time may be identified as multipath signals and discarded. For example, the control system may identify (i) signals that are received within timeframe $t_3-t_2$ at a particular point $P_4$ along the line-image sensor 104 as "valid" signals (not multipath signals) and (ii) signals that are received outside of timeframe $t_3-t_2$ at the particular point $P_4$ along the line-image sensor 104 as multipath signals. For example, if the line-image sensor receives an emission at time $t_4$ (i.e., outside of timeframe $t_3-t_2$) at position $P_3$, the control system may identify that emission as a multipath signal and discard or exclude that detected emission from any calculation of an estimated distance.

Figure 7:
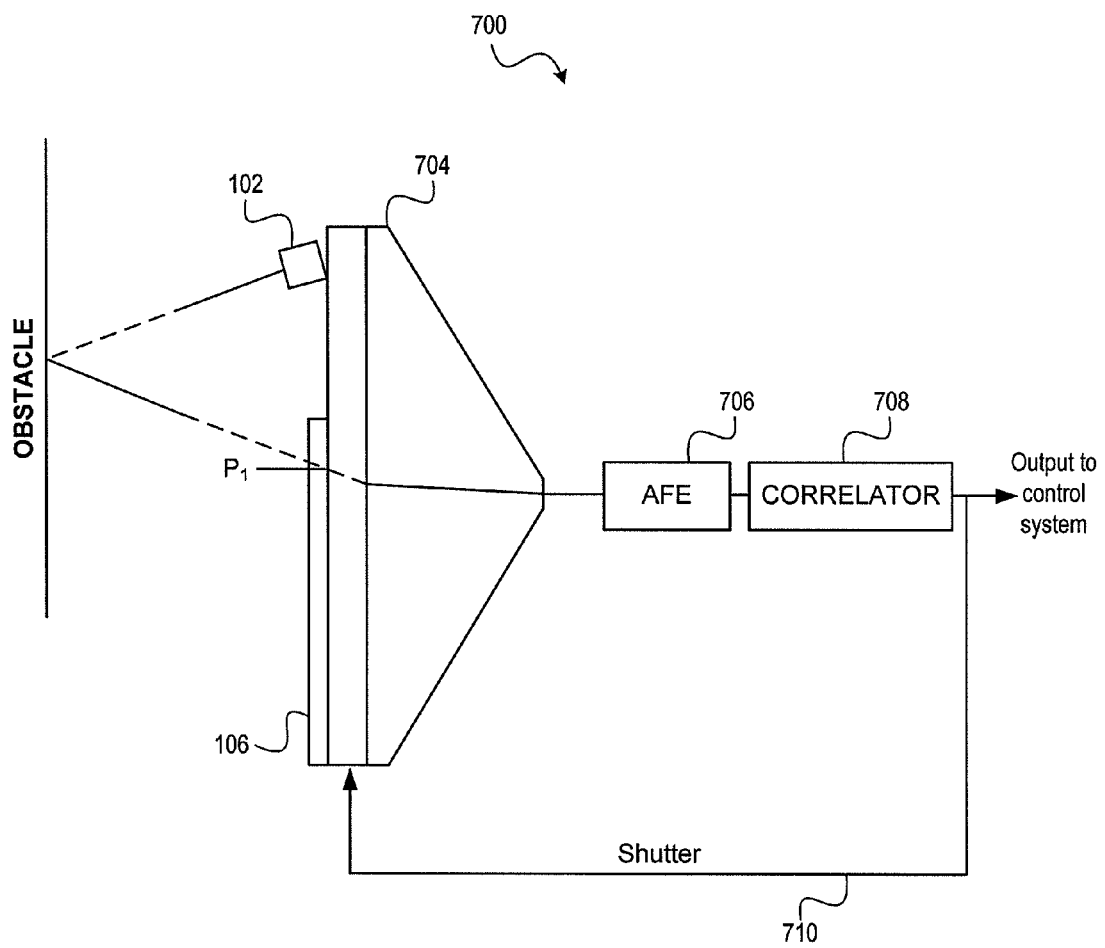
FIG. 7 is a block diagram of an example obstacle detection system, according to some embodiments.

FIG. 7 is a block diagram of an example obstacle detection system with a shutter, according to an example implementation. Obstacle detection system 700 may be used to help perform the windowing techniques described above in reference to FIGS. 5 and 6 and may include the same or similar elements of obstacle detection system 100 (or other systems described above). Obstacle detection system may include an analog front-end ("AFE") 706, a correlator 708, and a line-image sensor 704 that incorporates a shutter 710.

In some embodiments, light emitter 102 emits a plurality of light signals. In part to reduce potential issues associated with multiple access interference where multiple vehicles with similar sensors may be operating in relatively close proximity to one another, the plurality of light signals may be emitted in a pattern, such as a random pseudo-noise ("PN") code. For example, if multiple vehicles are all operating in a small area and are all using a similar optical-based obstacle detection system, it may be desirable to reduce multiple access interference by having each vehicle's optical detection system transmit light signals using a different PN code. In operation, the PN-coded light signals reflect off of an obstacle, and the reflected PN-coded light signals are detected by the line-image sensor 704 (e.g., at position $P_1$).

The line-image sensor 704 outputs an analog signal to the AFE 706, which may condition, or filter, the signal, and then digitize it. For example, the AFE 706 may apply one or more filters to the analog signal and then digitize the signal (e.g., by passing the received signal through an analog-to-digital converter). The AFE 706 then outputs the digital signal to the correlator 708.

In some embodiments, PN codes are used in a spreading scheme to enable the correlation of the PN code received at the receiver (e.g., received at the line-image sensor 704) with less than a complete match to the transmitted PN code (e.g., transmitted from the light emitter 102). This ability to correlate a partial match out of a noisy signal may be referred to as the coding gain provided by PN code spreading. Thus, the receiver may identify (e.g., via the correlator 708) the desired transmission even below the noise floor (e.g., the noised caused by ambient light).

In some embodiments, the correlator 708 will acquire PN code synchronization of the PN code amongst the received signal from the AFE 706. For example, the correlator 708 may look for a threshold correlation (e.g., a 30% correlation) in the received signal, as compared to an expected PN code. Once the correlator 708 finds a correlation between the received signal and an expected PN code, the control system may derive a time of flight (based on, e.g., the time between emission at the light emitter 102 and reception at the line-image sensor 704).

In a further aspect, once the correlator 708 finds a correlation between the received signal and an expected PN code, it the control system may use the derived time of flight and PN code to predict the incoming light signals and decrease false positive, false negatives, and multiple access interference by using the shutter 710. To do so, the control system may derive the timing to fire the shutter and then operate the shutter in accordance with the appropriate timing (e.g., to allow light to pass to the line-image sensor during active parts of a particular PN-code and to block light at other times). Shutter 710 may activate and deactivate to block at least a portion of the line-image sensor 104 from receiving emissions. This may be desirable, e.g., to reduce the effects of ambient noise and swamping (or blooming) of the line-image sensor photosensitive sites. In some embodiments, the control system may open the shutter only during the times when the PN code is expected to be received along the line-image sensor 704.

In some embodiments, the emitted light signal may comprise a PN sequence component and a beacon component. In operation, the shutter 710 may be timed to open and close based on the received beacon component. For example, a shutter system may be configured to activate and deactivate a shutter that blocks at least a portion of the line-image sensor form receiving reflected light. The shutter system may be configured to time the activation and deactivation of the shutter based on receipt of the beacon component of the emitted light signal.

In some example embodiments, a collision avoidance system may include an obstacle detection system (e.g., obstacle detection system 100), an inertial measurement unit configured to measure rotation and acceleration of a vehicle about one or more axes of the vehicle, and a control system that is communicatively coupled with the inertial measurement unit and the obstacle detection system. The obstacle detection system may be configured to identify and remove (or exclude) multipath signals from the data points that the system uses for estimating distance to a detected objects based on (i) the amount of time between the emission of the light signal from the light emitter and reception at the line-image sensor of the reflected light signal, and (ii) a position along the line-image sensor at which the line-image sensor received the reflected light signal. The control system may be further configured to control the vehicle to avoid detected objects by sending control outputs to the vehicle based on information received from the inertial measurement unit and the obstacle detection unit.

III. Illustrative Methods

FIG. 8 is a flowchart illustrating a method 800 for identifying a multipath signal in an obstacle detection system, according to some example embodiments. Method 800 (alone or perhaps in combination with other processes and methods disclosed herein) can be implemented by any of the obstacle detection systems disclosed herein, including but not limited to the systems shown and described with reference to FIGS. 1 through 7. In some embodiments, method 800 may be implemented by one or more processors and non-transitory computer-readable media having instructions that are executable to cause the device to perform functions described herein.

Method 800 and other processes and methods disclosed herein may include one or more operations, functions, or actions as illustrated by one or more of blocks 801-803. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of the disclosed embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 8 may represent circuitry that is wired to perform the specific logical functions in the process.

At block 801, method 800 includes emitting a light signal (e.g., by light emitter 102). In a further aspect, the light signal may be a plurality of light signals in a pattern, such as a PN code. In a yet further aspect, the light emitter may be rotating (e.g., sweeping in one or more axes as described above in reference to obstacle detection system 100). At block 802, method 800 includes receiving a reflection of the emitted signal at a position along a line-image sensor (e.g., line-image sensor 104).

At block 803, method 800 includes determining whether the reflection is a multi-path signal based at least in part on (i) an amount of time between emission of the light signal and reception of the reflection, and (ii) the position at which the line-image sensor received the reflection.

Additionally, the light signal may include a set of light signals that reflect off of an obstacle and return to the line-image sensor as reflected light signals. In this case, method 800 may further include estimating a distance from the line-image sensor to the obstacle based on the set of reflected light signals, wherein signals determined to be multi-path signals are excluded from the set.

In one example embodiment where the light emitter is configured to emit light signals in accordance with a particular PN code, the method 800 includes correlating a received plurality of light signal to the particular PN code. For example, a correlator (e.g., correlator 708) may use a threshold of correlation (e.g., 30% correlation) to determine when a received light signal matches the particular PN code. The method 800 further includes controlling a shutter to filter out reflected light signals that are not received in accordance with the particular PN code.

Method 800 may further include determining the time of flight. For example, once the received PN code is correlated to a particular PN code, method 800 may further include determining how much the PN code of the reflected light signal is delayed relative to the PN code of the emitted light signal to determine the amount of time between emission of the light signal from the light emitter and reception at the line-image sensor of the given reflected light signal.

V. Conclusion

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A system comprising:
a light emitter configured to emit a light signal;
a line-image sensor configured to receive reflected light signals at a plurality of positions along the line-image sensor; and
a controller communicatively coupled to the light emitter and the line-image sensor, the controller being configured to determine whether a given reflected light signal received at the line-image sensor is a multi-path signal based on (i) an amount of time between emission of the light signal from the light emitter and reception at the line-image sensor of the given reflected light signal, and (ii) a position along the line-image sensor at which the line-image sensor received the given reflected light signal;
wherein the controller is configured to determine that the given reflected light signal is a multi-path signal by:
determining the position along the line-image sensor at which the line-image sensor received the given reflected light signal;
based on the determined position, calculating a target window of time subsequent to emission of the light signal; and
determining that the line-image sensor received the given reflected light signal at a time outside of the target window of time;
wherein the line-image sensor has a proximate end and a distal end, the light emitter being positioned nearer to the proximate end than the distal end, and
wherein the target window of time is a length of time subsequent to emission of the light signal, the length of time being proportionate to a distance from the proximate end of the line-image sensor to the determined position along the line-image sensor at which the line-image sensor received the given reflected light signal.

2. The system of claim 1, wherein the light emitter is configured to emit a plurality of light signals that reflect off of an obstacle and return to the line-image sensor as the reflected light signals, and wherein the controller is configured to estimate a distance from the line-image sensor to the obstacle based on a set of reflected light signals, wherein signals determined to be multi path signals are excluded from the set.

3. The system of claim 1, wherein the light emitter and the line-image sensor are mounted on a rotatable component.

4. The system of claim 3, further comprising a motor configured to apply torque to the rotatable component.

5. The system of claim 1, wherein the light emitter is further configured to emit light signals in accordance with a particular pseudo-noise (PN) code, and wherein the system further comprises:
a filter configured to filter out reflected light signals emitted in accordance with a PN code other than the particular PN code.

6. The system of claim 5, wherein the controller is further configured to determine the amount of time between emission of the light signal from the light emitter and reception at the line-image sensor of the given reflected light signal by correlating a PN code of the emitted light signal with a PN code of the reflected light signal and, based on the correlation, determining how much the PN code of the reflected light signal is delayed relative to the PN code of the emitted light signal.

7. The system of claim 1, wherein the emitted light signal comprises a PN sequence component and a beacon component, and wherein the system further comprises:
a shutter system configured to activate and deactivate a shutter that blocks at least a portion of the line-image sensor from receiving the reflected light signal, wherein the shutter system is further configured to time the activation and deactivation of the shutter based on receipt of the beacon component of the emitted light signal.

8. A method comprising:
emitting a light signal from a light emitter in accordance with a particular pseudo-noise (PN) code, wherein the light signal comprises a plurality of light signals that reflect off of an obstacle and return to the line-image sensor as reflected light signals;
receiving a reflection of the emitted light signal, wherein the reflection of the emitted light signal is received at a position along a line-image sensor;
determining whether the reflection of the emitted light signal received at the line-image sensor is a multi-path signal based on (i) an amount of time between emission of the light signal and reception at the line-image sensor of the reflection of the emitted light signal, and (ii) the position along the line-image sensor at which the line-image sensor received the reflection of the emitted light signal;

estimating a distance from the line-image sensor to the obstacle based on a set of reflected light signals, wherein signals determined to be multi path signals are excluded from the set;

correlating a received plurality of lights signals to the particular PN code, and controlling a shutter to filter out reflected light signals emitted in accordance with a PN code other than the particular PN code; and determining the amount of time between emission of the light signal from the light emitter and reception at the line-image sensor of the given reflected light signal by determining how much the particular PN code of the reflected light signal is delayed relative to the particular PN code of the emitted light signal.

9. A collision avoidance system, comprising:

an inertial measurement unit configured to measure rotation and acceleration of a vehicle about one or more axes of the vehicle;

an obstacle detection unit comprising:
- a light emitter configured to emit a plurality of light signals;
- a line-image sensor configured to receive reflected light signals at a plurality of positions along the line-image sensor, wherein the reflected light signals comprise a reflection off of an obstacle of at least one of the plurality of light signals; and
- a controller communicatively coupled to the light emitter and the line-image sensor, the controller being configured to determine whether a given reflected light signal received at the line-image sensor is a multi-path signal based on (i) an amount of time between emission of the light signal from the light emitter and reception at the line-image sensor of the given reflected light signal, and (ii) a position along the line-image sensor at which the line-image sensor received the given reflected light signal; and a control system, wherein the control system is communicatively coupled with the inertial measurement unit and the obstacle detection unit, and wherein the control system is configured to control the vehicle to avoid detected objects by sending control outputs to the vehicle based on information received from the inertial measurement unit and the obstacle detection unit;

wherein the controller is further configured to estimate a distance from the line-image sensor to the obstacle based on a set of reflected light signals, wherein signals determined to be multi path signals are excluded from the set; and wherein the light emitter is further configured to emit light signals in accordance with a particular pseudo-noise (PN) code, and wherein the control system is further configured to filter out reflected light signals emitted in accordance with a PN code other than the particular PN code.

10. The system of claim 9, wherein the controller is further configured to determine the amount of time between emission of the light signal from the light emitter and reception at the line-image sensor of the given reflected light signal by correlating a PN code of the emitted light signal with a PN code of the reflected light signal and, based on the correlation, determining how much the PN code of the reflected light signal is delayed relative to the PN code of the emitted light signal.

* * * * *